No. 887,256. PATENTED MAY 12, 1908.
A. KÖNIG.
SCALE AND LEVEL HAND TELESCOPE.
APPLICATION FILED OCT. 4, 1907.

Witnesses
Paul Krüger
Fritz Sander

Inventor
Albert König

UNITED STATES PATENT OFFICE.

ALBERT KÖNIG, OF JENA, GERMANY, ASSIGNOR TO THE FIRM OF CARL ZEISS, OF JENA, GERMANY.

SCALE AND LEVEL HAND-TELESCOPE.

No. 887,256.  Specification of Letters Patent.  Patented May 12, 1908.

Application filed October 4, 1907. Serial No. 395,910.

*To all whom it may concern:*

Be it known that I, ALBERT KÖNIG, a citizen of the German Empire, and residing at Carl Zeiss strasse, Jena, in the Grand Duchy of Saxe-Weimar, Germany, have invented a new and useful Scale and Level Hand-Telescope, of which the following is a specification.

The invention consists in a double telescope, which permits—in free hand, but monocular, use—the angle of elevation or depression of an object sighted on to be conveniently determined. To accomplish this end, in one ocular field a scale of angles is arranged, which in the ordinary position of the double telescope, such as would occur in binocular use, may lie extended either in the horizontal or in the vertical direction. In each of these two arrangements the scale can always be utilized to determine horizontal angles, monocular use of the instrument being again assumed. In order to be able to measure the angle of elevation or depression with the scale in the one or the other arrangement, after having orientated the instrument so that the scale stands vertically, on the one or the other single telescope or on a member connecting the two telescopes a tubular spirit level is arranged parallel to that line of sight corresponding to the horizontal mark of the scale and in the eye-cup of the ocular equipped with the scale a magnifier is set, through which the level can be observed, either directly or with the help of a mirror, from the eye-point of the ocular. In such an arrangement, when the instrument with the scale-ocular is held in front of one eye, so that the scale stands vertically, the level—under observation by means of the magnifier—can be brought into play by canting the instrument, and then with changed direction of view, but without changing the situation of the eye, the angle of elevation or depression of the object sighted on can be read off in the field of view of the telescope.

Figure 1:
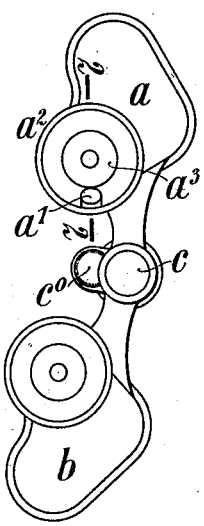
Figure 2:
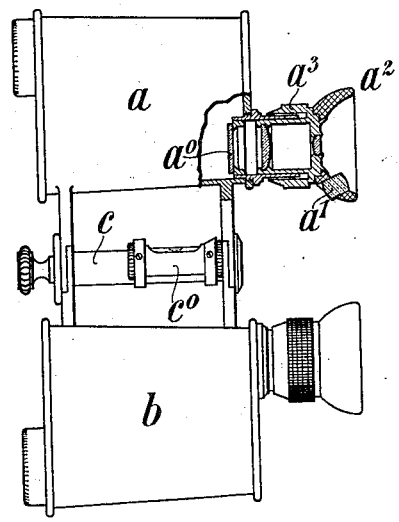
Figure 3:
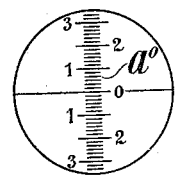

In the annexed drawing: Figure 1 is a front view of a double telescope equipped according to the invention. Fig. 2 is a side view of the same double telescope partly in section. Fig. 3 is an enlarged front view of the scale plate fixed in one of the ocular fields of the same double telescope.

The two single telescopes $a$ and $b$ are connected together by a hinge $c$, on which the tubular spirit level $c^0$ is fixed. In the ocular field of the telescope $a$ the scale $a^0$ is arranged on a glass plate in such a manner, that it stands approximately vertically in the vertical position of the double telescope. The magnifier $a^1$ is set in the eye-cup $a^2$ of the ocular, said eye-cup being rotatable about the mount $a^3$ of the lenses of the ocular. The observer is thus enabled to rotate the eye-cup independently of the ocular and thereby to bring the magnifier $a^1$ into the position as shown, in which the level $c^0$ is rendered visible, without disturbing the sharp focus of the ocular, supposed to have, as ordinarily is the case, focusing adjustment by screwing.

I claim:

1. In a double telescope having two oculars each fitted with an eye-cup, an external tubular spirit level, a transparent member in one of the individual telescopes with a plane surface in the field of the ocular and a scale of angles on this surface, and a magnifier in the eye-cup of the same ocular.

2. In a double telescope having two oculars each fitted with an eye-cup and adapted to be focused by screwing, an external tubular spirit level, a transparent member in one of the individual telescopes, with a plane surface in the field of the ocular and a scale of angles on this surface, and a magnifier in the eye-cup of the same ocular, the said eye-cup being rotatable about the axis of the ocular.

3. In a hinged double telescope comprising a hinge bolt and two oculars each fitted with an eye-cup and adapted to be focused by screwing, a tubular spirit level fixed to the hinge bolt, a transparent member in one of the individual telescopes, with a plane surface in the field of the ocular and a scale of angles on this surface, and a magnifier in the eye-cup of the same ocular, the said eye-cup being rotatable about the axis of the ocular.

ALBERT KÖNIG.

Witnesses:
PAUL KRÜGER,
FRITZ SANDER.